United States Patent [19]

Chang et al.

[11] Patent Number: 4,717,953
[45] Date of Patent: Jan. 5, 1988

[54] BRIGHTNESS CONTROL CIRCUIT FOR A TELEVISION RECEIVER

[75] Inventors: Albert Y. Chang, Taipei, Taiwan; Yoji Miyasako, Yokohama, Japan

[73] Assignee: RCA Corporation, Princeton, N.J.

[21] Appl. No.: 945,727

[22] Filed: Dec. 23, 1986

[30] Foreign Application Priority Data

May 8, 1986 [GB] United Kingdom ............... 8611235

[51] Int. Cl.⁴ .................. H04N 5/57; H04N 9/72; H04N 9/77
[52] U.S. Cl. .................................. 358/34; 358/39; 358/168; 358/172
[58] Field of Search ............... 358/21 R, 34, 39, 168, 358/172, 74

[56] References Cited

U.S. PATENT DOCUMENTS

| | | | |
|---|---|---|---|
| 3,374,310 | 3/1968 | Beers | 358/27 |
| 3,921,205 | 11/1975 | Fujiwara et al. | 358/34 |
| 4,110,790 | 8/1978 | Wheeler | 358/172 |
| 4,197,557 | 4/1980 | Tuma et al. | 358/34 |
| 4,554,577 | 11/1985 | Shanley et al. | 358/34 |

*Primary Examiner*—John W. Shepperd
*Attorney, Agent, or Firm*—Paul J. Rasmussen; Peter M. Emanuel; Ronald H. Kurdyla

[57] ABSTRACT

In a television receiver, the brightness of a displayed image is controlled in response to a reference voltage having a magnitude related both to the magnitude of a voltage derived from a viewer adjustable brightness control, and to the magnitude of the DC level of color information signals during image blanking intervals.

8 Claims, 1 Drawing Figure

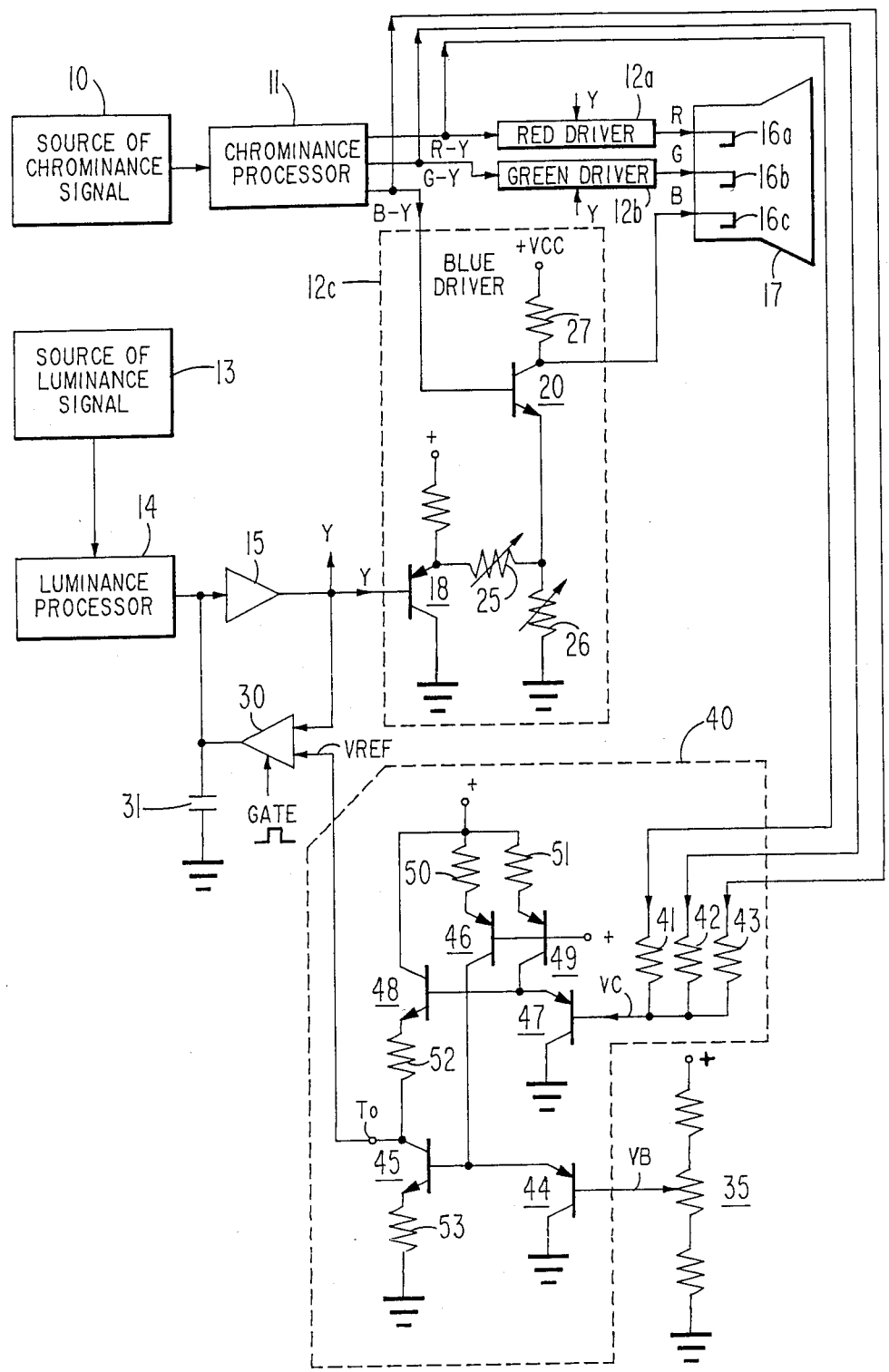

BRIGHTNESS CONTROL CIRCUIT FOR A TELEVISION RECEIVER

This invention concerns an image brightness control circuit suitable for use in a video signal processing and display system such as a television receiver. In particular, this invention concerns a brightness control circuit for automatically reducing the effects of undesirable DC offset errors without requiring a separate adjustable control to compensate for such offset errors.

Television receivers commonly include a viewer adjustable manual control, such as a potentiometer, for controlling the DC content of a video signal to thereby determine the brightness of a displayed video image. Some television receivers also include a pre-set variable resistor coupled to the brightness control circuit to compensate for unwanted DC offsets which can adversely affect the brightness of a displayed image, and which can complicate the design of DC coupled video signal processing circuits. The pre-set variable resistor is commonly used to compensate for large quiescent DC offset errors associated with chrominance signal outputs of a chrominance signal processor of the receiver. By so doing, the pre-set variable resistor reduces the magnitude of unwanted DC voltage offsets at the video signal output electrode of a display driver amplifier which drives a signal input electrode (e.g., cathode electrode) of an image displaying kinescope. However, the pre-set adjustable resistor undesirably adds to the cost of the receiver, and its adjustment is a time consuming process during factory or service alignment of the receiver.

In the absence of the compensating adjustment provided by the pre-set variable resistor or otherwise, the video signal would exhibit a larger than normal DC level variation at the output of the display driver amplifier. Such an increased DC level variation complicates the design of the display driver amplifier, and may require a greater than normal operating supply voltage for the driver stage. Thus compensation for such DC offsets advantageously permits a smaller variation of the DC level of the video signal in response to the setting of the brightness control for normal brightness control purposes.

In accordance with the principles of the present invention, there is disclosed herein a brightness control system which avoids the need for a pre-set variable resistor to compensate for the DC offsets noted above. Specifically, the DC level of the video signal, and thereby image brightness, are established in response to a control voltage which is related both to a voltage derived from a viewer adjustable brightness control, and to a voltage representative of the quiescent DC condition of a video signal chrominance component. In a disclosed preferred embodiment of the invention, the brightness of a displayed image is determined in response to a control voltage provided by a comparator. The comparator acts as a feedback clamp which is keyed during image blanking intervals to compare the black level of a luminance signal with a reference voltage. The reference voltage is related both to a voltage derived from the viewer adjustable brightness control, and to the quiescent DC condition of color difference signal components.

The single FIGURE of the drawing shows a portion of a color television receiver including brightness control apparatus in accordance with the principles of the present invention.

A chrominance signal component of a composite color video signal is provided from a source 10 to a chrominance signal processor 11, e.g., including amplifying, gain control and phase shifting stages, which produces output color difference signals R-Y, G-Y and B-Y. The color difference signals are respectively DC coupled to color signal inputs of DC coupled red, green and blue matrix driver stages 12a, 12b and 12c. A luminance signal component of the composite color video signal is provided from a source 13 to a luminance signal processor 14, e.g., including amplifying, gain control, level shifting and peaking stages. A luminance output signal from processor 14 is DC coupled via a buffer amplifier 15 to luminance signal inputs of stages 12a, 12b and 12c, wherein the luminance signal (Y) is respectively combined with the color difference signals to produce high level amplified color image representative video signals R, G and B suitable for driving intensity control cathode electrodes 16a, 16b and 16c of a color image reproducing kinescope 17.

Matrix driver stages 12a, 12b and 12c are similar in configuration as indicated by the circuit details of blue driver 12c. Driver 12c includes a PNP emitter follower transistor 18 which conveys the luminance signal via a variable resistor 25 to the emitter circuit of a high voltage video output display driver transistor 20. A base input electrode of transistor 20 receives the B-Y color difference signal from processor 11, and high level video output signal B is developed in the collector circuit of transistor 20 across a load resistor 27.

Resistor 25 is adjusted during alignment of the receiver to establish the signal gain of the driver stage. An adjustable resistor 26 in the emitter circuit of transistor 20 is adjusted during alignment of the receiver to establish the DC bias for the driver stage, thereby establishing the DC bias for cathode 16c of kinescope 17. Resistor 26 is adjustable to establish the cut-off bias voltage for cathode electrode 16c.

The brightness of a displayed image is automatically controlled by means of a keyed feedback clamp circuit including a keyed differential comparator 30 and a storage capacitor 31, of the type described in U.S. Pat. No. 4,197,577 for example. One input of comparator 30 is coupled to the luminance signal output of amplifier 15. Another input of comparator 30 receives a brightness reference voltage VREF. A GATE signal renders normally nonconductive comparator 30 operative during periodic horizontal image blanking intervals, e.g., during the so-called "back-porch" interval of each horizontal blanking interval, at which time video signal image information is absent and a DC level closely approximating black level is present at the outputs of both chrominance processor 11 and luminance processor 14.

Comparator 30 produces an output control voltage with a magnitude related to the difference between the luminance signal and VREF inputs to comparator 30. The control voltage is stored by capacitor 31 and coupled to the luminance signal path between the output of processor 14 and the input of amplifier 15. The control voltage varies the brightness determinative DC level of the luminance signal until, by feedback action, the input voltages of comparator 30 are substantially equal, corresponding to a condition of desired image brightness.

The DC level of the luminance signal, and thereby the brightness of a displayed image, are a function of the magnitude of brightness reference voltage VREF applied to comparator 30. In accordance with the principles of the present invention, brightness reference voltage VREF is provided from an output terminal $T_0$ of a signal combining circuit 40. The magnitude of voltage VREF is related to a DC voltage derived from the wiper of a viewer adjustable brightness control potentiometer 35, and to a DC voltage derived from the color difference signal outputs of chrominance processor 11, as discussed below. The brightness determinative black level of the luminance signal, as established by the action of the feedback clamp including comparator 30, tracks with the average quiescent DC level of the color difference signals. It has been found that this brightness control arrangement advantageously avoids the need for an additional (pre-set) adjustable resistor, e.g. in series with brightness control potentiometer 35, to compensate for unwanted DC offset errors in the color difference signal outputs of chrominance processor 11, for example.

Combining network 40 has two inputs. One input receives a variable brightness determinative voltage VB from the wiper of brightness control potentiometer 35. Another input of network 40 receives a combined voltage VC derived from the color difference signal outputs of chrominance processor 11. The color difference signals each exhibit a quiescent DC level during video signal blanking intervals when comparator 30 is keyed to operate in response to the GATE signal. In practice, the DC levels of the color difference signals exhibit mutually different values due to circuit tolerances, for example. During horizontal image blanking intervals, the magnitude of signal VC represents the average value of the DC levels of the R-Y, G-Y and B-Y color difference signals as combined by equal value resistors 41, 42 and 43.

Voltages VB and VC appear in combined form, as reference voltage VREF, at output terminal $T_0$ of network 40. Voltage VB is conveyed to terminal $T_0$ via a first path including opposite conductivity type coupling transistors 44 and 45 in a "zero offset" emitter follower configuration and a current source transistor 46, arranged as shown. Voltage VC is conveyed to terminal $T_0$ via a second path including opposite conductivity type coupling transistors 47 and 48 in a "zero offset" emitter follower configuration and a current source transistor 49, arranged as shown. The first and second paths exhibit substantially identical operating characteristics, with resistors 50 and 51 having equal values and resistor 52 and 53 having equal values. Thus the magnitude of reference voltage VREF is related to the magnitude of brightness control voltage VB and to the magnitude of voltage VC which is representative of the average value of the DC levels of the color difference signals during video signal blanking intervals. When chrominance processor 11 and luminance processor 14 are constructed as an integrated circuit, combining network 40 preferably is included in the same integrated circuit.

The color difference signals typically exhibit quiescent DC level differences which are large enough to require compensation. Such compensation often takes the form of an adjustable resistor coupled in series with the resistive element of the brightness control potentiometer. It has been found that the need for such an adjustable resistor is avoided through the use of the disclosed arrangement including network 40.

The DC offset error to be compensated is primarily due to unacceptably large DC offsets associated with the color difference signals due to a variety of factors such as circuit tolerances, for example. Variations in the base-emitter junction voltages of driver amplifier transistors 18 and 20 are also present, but such variations are much smaller and less troublesome than the DC offsets associated with the color difference signals. Illustratively, in one system a color difference signal DC offset variation of 0.8 volts (±0.4 volts) was observed, whereas a much smaller offset variation of approximately 0.05 volts was observed in the case of the base-emitter voltages of transistors 18 and 20.

What is claimed is:

1. In a system for processing and displaying information contained in a color image representative video signal, apparatus comprising:
    a video signal channel;
    an adjustable control for providing a first signal with a magnitude determinative of the brightness of a displayed image;
    means for providing a second signal with a magnitude related to the magnitude of the DC content of a color information component of said video signal;
    means for combining said first and second signals to produce a reference signal; and
    control means responsive to said video signal and to said reference signal for controlling the image brightness representative DC level of said video signal in accordance with the magnitude of said reference signal.

2. Apparatus according to claim 1, wherein
    said control means operates during periodic video signal image blanking intervals for modifying said DC level of said video signal in accordance with said magnitude of said reference signal.

3. Apparatus according to claim 2, wherein
    said control means comprises a keyed comparator with a first input for receiving said video signal, a second input for receiving said reference signal, and an output coupled to said video signal channel; and
    said comparator is keyed to operate during horizontal image blanking intervals.

4. Apparatus according to claim 1, wherein
    said system processes plural color image representative video signals; and
    said providing means combines said plural color video signals to produce said second signal.

5. Apparatus according to claim 1, wherein
    said video signal comprises a luminance component and a chrominance component containing color information; and
    said providing means provides said second signal with a magnitude related to the magnitude of the DC content of said chrominance component.

6. Apparatus according to claim 5, wherein
    said chrominance component comprises plural color difference signals; and
    said providing means combines said plural color difference signals to produce said second signal with a magnitude related to the magnitude of the DC content of combined color difference signals.

7. Apparatus according to claim 6, wherein
    said providing means comprises plural impedances of substantially equal value for respectively conveying said plural color difference signals to a signal combining point at which said second signal is developed.

8. In a color television receiver for processing a video signal comprising a luminance component and a chrominance component containing plural color difference signal components, said receiver including a luminance processing channel and a chrominance processing channel; apparatus comprising:

a manually adjustable control for providing a first signal with a magnitude determinative of the brightness of a displayed image;

first means for combining said plural color difference signal components to produce a second signal with a magnitude related to the magnitude of the DC content of said plural color difference signals;

second means for combining said first and second signals to produce a reference signal; and comparator means responsive to said luminance component and to said reference signal for providing an output control signal to said luminance processing channel during prescribed intervals to control an image brightness representative DC level of said luminance component in accordance with the magnitude of said reference signal.

* * * * *